(12) United States Patent
Knöß et al.

(10) Patent No.: US 12,485,943 B2
(45) Date of Patent: Dec. 2, 2025

(54) TRANSPORT DEVICE AND SYSTEM FOR PROCESSING WORKPIECES

(71) Applicant: Skybrain Vermögensverwaltungs GmbH, Rödermark (DE)

(72) Inventors: Florian Knöß, Frankfurt (DE); Björn Schneider, Langen (DE)

(73) Assignee: Skybrain Vermögensverwaltungs GmbH, Rodermark (DE)

( * ) Notice: Subject to any disclaimer, the term of this patent is extended or adjusted under 35 U.S.C. 154(b) by 629 days.

(21) Appl. No.: 17/306,096

(22) Filed: May 3, 2021

(65) Prior Publication Data

US 2021/0339781 A1 Nov. 4, 2021

(30) Foreign Application Priority Data

May 4, 2020 (DE) .................. 20 2020 102 489.2

(51) Int. Cl.
*B62B 3/00* (2006.01)
*B62B 3/02* (2006.01)
*B62B 3/04* (2006.01)

(52) U.S. Cl.
CPC .............. *B62B 3/005* (2013.01); *B62B 3/003* (2013.01); *B62B 3/004* (2013.01); *B62B 3/02* (2013.01); *B62B 3/04* (2013.01)

(58) Field of Classification Search
CPC ......... B62B 3/005; B62B 3/003; B62B 3/004; B62B 3/02
See application file for complete search history.

(56) References Cited

U.S. PATENT DOCUMENTS

| 5,377,476 A | 1/1995 | Bohmer | |
|---|---|---|---|
| 9,827,662 B1* | 11/2017 | Liu | A47B 9/04 |
| 2019/0344699 A1* | 11/2019 | Radetzki | B62B 3/005 |
| 2020/0222261 A1* | 7/2020 | Ito | G06K 19/0728 |
| 2020/0247444 A1* | 8/2020 | Lucas | B62B 3/02 |

FOREIGN PATENT DOCUMENTS

| CN | 202162799 U | 3/2012 |
|---|---|---|
| CN | 205799447 U | 12/2016 |
| CN | 109843503 A | 6/2019 |
| JP | H2134039 U | 11/1990 |

(Continued)

*Primary Examiner* — Saul Rodriguez
*Assistant Examiner* — Willie W Berry, Jr.
(74) *Attorney, Agent, or Firm* — McDonnell Boehnen Hulbert & Berghoff LLP

(57) ABSTRACT

The present invention refers to a transport device with at least one transport system for jointly transporting at least one tool and at least one workpiece, wherein the transport system has a ceiling wall, a floor wall spaced apart from the ceiling wall, at least one side wall and at least one intermediate space between the ceiling wall and the floor wall, and wherein the intermediate space has at least one opening. In order to enable simultaneous and safe transport of one or more workpieces together with the tools required for machining and thus in particular to reduce downtimes of machining machines as well as costs, the ceiling wall or a cover plate connected therewith as well as the at least one intermediate space each have at least one holder, wherein the at least two holders are set up to receive the at least one workpiece and/or the at least one tool.

16 Claims, 9 Drawing Sheets

(56) References Cited

FOREIGN PATENT DOCUMENTS

| | | |
|---|---|---|
| JP | H446001 U | 4/1992 |
| JP | H04354643 A | 12/1992 |
| JP | H05146959 A | 6/1993 |
| JP | H05192851 A | 8/1993 |
| JP | S63102857 A | 3/1994 |
| JP | 2000126995 A | 5/2000 |
| JP | 2003292159 A | 10/2003 |
| JP | 2011223008 A | 11/2011 |
| TW | 201925937 A | 7/2019 |
| WO | 1992/02950 | 2/1992 |
| WO | 2018007197 A1 | 1/2018 |

* cited by examiner

TRANSPORT DEVICE AND SYSTEM FOR PROCESSING WORKPIECES

CROSS-REFERENCE TO RELATED APPLICATIONS

The present application claims priority to and the benefit of German Patent Application No. 20 2020 102 489.2 filed on May 4, 2020, the entire contents of which are incorporated herein by reference.

FIELD

The present invention relates to a transport device with at least one transport system for jointly transporting at least one tool and at least one workpiece, wherein the transport system has a ceiling wall, a floor wall spaced apart from the ceiling wall, at least one side wall, and at least one intermediate space between the ceiling wall and the floor wall, and wherein the intermediate space has at least one opening.

In addition, the present invention relates to a system for processing workpieces, preferably printed circuit boards, wherein the system for processing workpieces has at least one transport device as well as at least one processing machine, wherein the at least one transport device is set up to transport at least one of the workpieces and at least one of the tools to the at least one processing machine.

BACKGROUND

Known from prior art are various transport devices for transporting tools and workpieces, as well as for changing the tools of machine tools.

In automatic production and manufacturing plants, the workpieces run through the production and manufacturing process fully automated. For this purpose, the workpieces are transported to the corresponding processing machines and processed by the latter. In cases where a processing machine performs several processing steps and requires various tools to do so, for example drills with varying diameters, the processing machines often have so-called magazines for the tool change. The number of tools that can be accommodated in the magazines, for example, is in part severely limited.

However, since not all production and manufacturing processes are suitable for full automation, many production and manufacturing processes are often at least partially mechanized. Among other things, the human or worker is here responsible for process monitoring, tool change, tool feed, individual processing steps and/or quality control.

Known for processing printed circuit boards is to stack the printed circuit boards on a transport trolley, and have a worker transport them to a processing machine. The printed circuit boards are then buffered in front of the processing machine, so as to always ensure a sufficient replenishment. After processing is complete, the printed circuit boards are transported to the next processing machine, until the printed circuit boards have finally run through all processing steps.

Various, often combinable, approaches and measures exist to optimize the production and manufacturing processes in terms of time and cost. Organizational measures and production planning measures allow the processing machines and/or tool and/or workpiece mount to be arranged optimized for the route, for example, as a result of which the path traversed by a device and/or the routes for a worker can be minimized.

A production and manufacturing process for various workpieces or model types can here require that a worker responsible for a processing machine must decide, based on the present workpiece or model type, which tools he or she requires for processing. The worker then retrieves the required tools, for example from a warehouse, and equips the processing machine. The time required to retrofit the processing machine, which in particular consists of the actual retrofit and supply of tools, ensures that the processing machine is shut down.

An elevated downtime for the processing machines proves disadvantageous, since this in particular diminishes the produced piece numbers, thereby indirectly increasing the piece costs.

SUMMARY

Therefore, the object of the present invention is to provide a transport device that within a manufacturing process enables a simultaneous and safe transport of one or several workpieces together with the tools required for processing, making it possible in particular to reduce the downtimes of processing machines and save costs. In addition, the object of the present invention is to provide a system for processing the workpieces, wherein the system for processing the workpieces enables a time and cost-optimized manufacture through the use of the transport device.

The object of the present invention is achieved with a transport device and a system for processing workpieces.

To this end, it is provided that both the ceiling wall or a cover plate connected therewith as well as the at least one intermediate space of the transport system each have at least one holder (receptacle and/or support), wherein the at least two holders are set up to receive the at least one workpiece and/or the at least one tool. The at least one holder of the at least one intermediate space here preferably receives at least one tool, and the at least one holder of the ceiling wall or the at least one holder of the cover plate connected with the ceiling wall preferably receives at least one workpiece. Usually, a holder (receptacle and/or support) is thus preferably used either for at least one tool or at least one workpiece.

The at least one workpiece preferably serves to completely process the at least one workpiece on at least one processing machine. Several tools in particular with varying diameters or geometries are often required for completely processing workpieces, in particular for completely processing printed circuit boards. The intermediate space of the transport system, which is arranged between the ceiling wall and the floor wall, can be subdivided by intermediate walls or other structural elements. Each intermediate space and the ceiling wall or the cover plate connected with the ceiling wall here each preferably have at least one holder. A holder here in particular provides for the fixation of the at least one workpiece and/or at least one tool. The fixation here preferably allows for the ability to remove the at least one workpiece and/or tool in only one direction of movement. It can here be advantageous that the workpiece and/or tool can only be removed by exerting a force. To this end, additional fasteners can be provided, such as rubber lips, which partially overlap the workpiece and/or tool in the direction of movement. The workpiece is preferably a printed circuit board, and the at least one tool is a cutting tool, for example a drill or milling tool.

The intermediate space between the ceiling wall and the floor wall of the transport system preferably has at least one side wall. In order to ensure a sufficient stability of the transport system as well as prevent any undesired contamination of the intermediate space, however, the transport system preferably has at least two side walls. The at least one opening of the intermediate space is preferably arranged on one of the side walls. Alternatively, however, the opening can also be arranged at another location, in particular on the ceiling wall and/or the cover plate connected with the ceiling wall. The opening allows access to the intermediate space, and can thereby serve to remove a workpiece or tool from the intermediate space. In a preferred embodiment, in which the at least one opening of the intermediate space is arranged on one of the side walls, the ceiling wall additionally has a perforation, preferably a slotted perforation.

The intermediate spaces, in particular the intermediate spaces with two opposing side walls, can alternatively or additionally also be at least partially configured in such a way that the holders are designed solely in the form of lateral, opposing support elements or rails. As a result, (finished or yet to be processed) printed circuit boards, for example, can be inserted into an intermediate space configured in this way, and come to rest on the lateral support elements. The side walls of the intermediate space to which the support elements are fastened are preferably configured in such a way that the support elements can be mounted in their position offset.

For several applications, it may be advantageous for the at least one side wall of the transport system to be divided. To this end, the one part of the at least one side wall can be connected with the ceiling wall, and the other part of the at least one side wall with the floor wall. When assembling the transport system, the two parts of the side wall can then be connected with each other using common connecting methods and connecting means.

The transport device, and thus also the transport systems and the cover plate (if present), preferably have a modular configuration. This means that the at least one transport system and the cover plate each have a first state, in which they are in contact with each other, and each have a second state, in which they are separated from each other. As a consequence, the at least one transport system is in contact with the cover plate and/or another transport system in the first state. If the transport systems and the cover plate are in the first (assembled) state, this yields the transport device. In the second state, the transport device is broken down into the individual transport systems and the cover plate (if present). All cover plates and transport systems are preferably configured in such a way that they can be combined as desired, as a result of which a modularity for the transport device can be achieved.

Alternatively, in particular the cover plate can also not have a modular configuration, i.e., the cover plate is fixedly connected with a transport system. However, a modularly configured cover plate offers advantages when using the transport device in processing centers, since the cover plate can be separated from the transport system and removed. This makes it possible to place the cover plate in a position suitable for processing a workpiece, or insert the cover plate directly into a processing machine. In addition, the modular construction makes it easier to clean the cover plate as well as the transport systems. The modularity of the cover plate simultaneously ensures that the transport system of a transport device arranged under the cover plate can be changed out as desired, so that the structure of the transport device can be freely configured. The structure of the transport device can thus be adjusted to the workpieces to be manufactured, the used processing machines, the working environment, etc.

In the first state, at least partial contact exists between the transport systems in a case where the transport device has several transport systems, and at least partial contact exists between the ceiling wall of a transport system and the cover plate in a case where the transport device has a cover plate. The ceiling wall of a transport system preferably has a perforation in the form of slits or inlets, which is set up to interact with corresponding counter-pieces of the cover plate or a transport system arranged thereover. In an assembled state, the perforation can prevent a lateral displacement of the overlying cover plate or the overlying transport system, i.e., the cover plate arranged above the transport system or the transport system arranged above a transport system.

The cover plate is connected, in particular positively, with the ceiling wall of one of the transport systems of the transport device. Other common and known connecting techniques can be equally applied, wherein detachable connecting techniques are to be preferred based on the modularity achieved as a result. However, the working conditions can also require that the cover plate be fixedly connected with the transport system, in particular with the ceiling wall, or that the transport systems be fixedly connected with each other.

In a preferred embodiment, the at least one transport system and the cover plate have at least two laterally arranged handle tabs. The handle tabs are here symbolic for any type of component that can be arranged on the cover plate independently of the floor and any side walls, and is suitable to be gripped by a worker or a machine, for example a robot. Finally, the handle tabs of the at least one transport system and the cover plate serve to separate the transport system and cover plate or transport system and transport system, to move, lift and handle. In addition, the handle tabs secure the transport systems and cover plate relative to each other, for example against an inadvertent lateral shifting or an inadvertent separation.

The handle tabs of the at least one transport system preferably engage into the handle tabs of the cover plate. The handle tabs are here preferably configured in such a way that the handle tabs of the transport system engage into the handle tabs of the cover plate in an assembled first state. The engaging of the handle tabs of the transport system into the handle tabs of the cover plate here secures the cover plate on the transport system, so that the cover plate and the transport system do not inadvertently separate during a transport of the transport device. In addition, the handle tabs of a lower transport system also serve to orient a transport system to be arranged thereover or a cover plate to be arranged thereover. The handle tabs are here conceived in such a way that an upper transport system or an upper cover plate arranged on a transport system arranged thereunder are secured against a lateral slippage. The handle tabs here limit the lateral movement of a transport system lying thereover or a cover plate lying thereover in an axial direction, wherein the handle tabs simultaneously ensure, through engagement, that a displacement orthogonal to the lateral direction is likewise blocked. A disassembly of the transport device, i.e., a transfer of the transport device from a first into a second state, thus preferably takes place by upwardly removing the uppermost element, i.e., the cover plate or the uppermost transport system.

According to one embodiment, the at least one holder of the ceiling wall or the cover plate is set up to receive the at least one workpiece. Receiving the at least one workpiece in the holder of the ceiling wall or the cover plate is preferred in particular when the workpiece has a large area in relation to its height, for example as is the case for printed circuit boards. In addition, receiving the workpiece in the at least one holder of the ceiling wall or the cover plate is to be preferred if the workpiece is susceptible, meaning has sensitive components, and can already become damaged through light contact with other workpieces and/or the transport device. The depression of the holder can be configured in such a way that, when receiving a workpiece and/or tool, the latter sinks completely into the depression. Furthermore, it can be preferred that the holder of the intermediate space also have a depression.

It is further preferred that the at least one opening of the intermediate space be arranged on a side wall of the transport system, wherein the opening is at least identical to a cross sectional surface of the at least one intermediate space. However, if the opening is arranged on another wall, for example on the ceiling wall, the opening can also have other dimensions. Should the opening be arranged on the ceiling wall, it is advantageous that the cover plate (if present) simultaneously have an opening, so that the openings of the ceiling wall and the cover plate together serve to ensure access to the intermediate space. Since the openings are preferably intended to remove the at least one workpiece and/or tool, the dimensions of the workpiece and/or tool are to be considered for selecting the dimensions of the openings. If one of the openings is arranged on a side wall of the transport system, and the opening is preferably at least identical to a cross sectional surface of the at least one intermediate space, it can be advantageous for another opening to be arranged on the opposing side wall. This can enable a removal of the workpiece and/or tool on both sides.

In a preferred embodiment, the at least one holder of the at least one intermediate space has a transport box. The transport box can have additional elements for fixing the workpieces and/or tools. In addition, the transport box can have various subdivisions, in particular by way of partition walls. It is here possible that each subdivision have a tool for a processing step. However, the various transport boxes can also have tools for the individual processing steps. If this transport system has several intermediate spaces, several transport boxes can be arranged in each intermediate space.

The at least one transport box can preferably be moved from a retracted position into an extended position. This is preferred in particular when the intermediate space is arranged between the ceiling wall and the floor wall, wherein the ceiling wall covers the intermediate space. In order to move the at least one transport box from a retracted into an extended position, the at least one transport box can have at least one guiderail. The at least one guiderail preferably has a counter-piece arranged in the intermediate space. In addition, it is preferred that the at least one guiderail and/or the counter-piece have a stop, so that the at least one guiderail cannot slide completely out of the counter-piece. For example, an alternative system for moving the at least one transport box from a retracted into an extended position provides rollers on the transport boxes. Other common options for moving the at least one transport box from a retracted into an extended position are also conceivable and combinable. In addition, it can be preferred that the transport system of the transport device have two opposing openings, so that the transport box can be pulled out of the intermediate space on both sides. However, if the transport system only allows the transport box to be pulled out on one side, it can be preferred for the side lying opposite the opening to limit the entry of the transport box. The lateral support elements or rails can likewise be configured in such a way that they can be moved from a retracted position into an extended position.

In a case where the at least one transport box has at least one guiderail, it is advantageous if the at least one transport box is guided over at least one guiderail, wherein the transport box is secured in at least one of the retracted or extended positions by latching means. It is here preferred that the latching means be arranged in the guiderail, so that the transport box, for example, is secured against inadvertently exiting in a retracted position, and inadvertently entering in an extended position.

Alternatively or additionally, it can be preferred that the at least one transport box be secured in the retracted position by at least one magnet. The at least one magnet can here in particular be arranged on a wall lying opposite the opening or another side wall of the intermediate space. In addition, it can be advantageous for the transport box to also have at least one magnet. Alternatively, the transport box and/or the wall lying opposite the opening can have a magnetic material, so that the arrangement of the least one magnet takes place only on the transport box or a side wall of the intermediate space.

In a preferred embodiment, the transport device has a sensor device, which determines the position of the transport box. For example, such a sensor device can have an optical sensor or a touch sensor, and is preferably arranged on the floor wall of a transport system. Alternative sensor types and positionings can likewise be used and/or combined. It can be preferred that the sensor device further acquire additional information, for example about the removal of the at least one workpiece and/or the at least one tool. It can also be advantageous that the information acquired by the sensor device be fed or imparted to another system, for example to a processing machine and/or a worker and/or a transport trolley. In a case where the information is imparted to a transport trolley, the latter can detect when the processing has ended, and carry out the transport of the transport device to the next processing machine.

Moreover, the transport box can have at least one cassette for receiving the at least one tool. A cassette can here be provided for each processing step and/or workpiece. In addition, it can be advantageous for the at least one cassette to be detachably connected with the transport box. This can enable a removal of the at least one cassette.

The tool and/or the holder of the at least one workpiece and/or of the at least one tool and/or the transport box and/or the cassette and/or the cover plate preferably has at least one marking, in particular a color marking. For example, the marking can be drawn upon to determine the sequence for using the at least one tool and/or the processing machine on which a tool is to be used, and/or the sequence for processing the at least one workpiece. Such a marking can likewise be used to determine the transport system to which a cover plate belongs. The type of marking should preferably be determined after the marking has been used and/or after the marking has been placed.

It can be advantageous for the transport device to have at least two transport systems connected with each other, wherein the floor wall of the one transport system is connected with the ceiling wall of the other transport system and/or the handle tabs of the one transport system are connected with the handle tabs of the other transport system, and wherein the at least two transport systems preferably have a positive connection. The at least one workpiece can here be arranged in the holder of the cover plate, and the tools can be arranged in the intermediate spaces of the transport systems grouped by processing machine and/or processing step. In addition, it can alternatively be advantageous for the at least one tool to be arranged in the holder of the ceiling wall or the cover plate, and for the workpieces to be arranged in the at least one intermediate space, for example grouped by model type. Furthermore, it can be preferred that the transport systems connected with each other be arranged one over the other, wherein the floor wall of the upper transport system touches the ceiling wall of the underlying transport system. The cover plate can then be placed on the ceiling wall of the uppermost transport system. The transport systems are preferably positively connected with each other, as well as with the cover plate. In particular, it is preferred that the transport systems and/or the cover plate have corresponding perforations on the contact surfaces, which in particular prevent a lateral slippage in the (assembled) first state. In addition, the handle tabs of a respective transport system can support the connection of transport systems and cover plate with each other. Alternatively, the transport systems can also be arranged side by side.

The at least two transport systems preferably have a positive connection, for example with the help of handle tabs.

In an embodiment, the transport device has an individual label. The type of label should preferably be determined based on how the label is used and/or how the label is placed. The label of the transport device can preferably be acquired by a system and/or a worker, so that the transport device can be tracked in a manufacturing and production process.

It can be preferred that the at least one holder of the ceiling wall or the cover plate have a depression. The depression can be adjusted to the shape of the workpiece and/or tool. In an exemplary embodiment, the depression can in particular be adjusted to the outline of the workpiece and/or tool. In a case where the holder has a depression with a workpiece and/or a tool, the direction of movement for removing the workpiece and/or the tool runs out of the holder of the ceiling wall or the cover plate, preferably perpendicularly to the latter. In addition, the depression in the ceiling wall or the cover plate can also be configured in such a way that a workpiece rests on the ceiling wall or the cover plate only in the edge and/or corner areas, and that part of the workpiece protrudes into the depression. In this way, the components that protrude into the depression can be protected against environmental influences.

Moreover, it can be advantageous that the ceiling wall or cover plate be configured in such a way that a slanted cassette can be arranged on the ceiling wall or cover plate. Slanted cassettes can here serve as goods carriers or workpiece carriers, so that, in particular in a fully automated process, printed circuit board blanks, for example, can be individually removed from the slanted cassette in a targeted manner.

Moreover, the use of at least one transport device in a system for processing workpieces is preferred. A system for processing workpieces, preferably printed circuit boards, here preferably has at least one transport device according to one of the preceding claims as well as at least one processing machine, wherein the at least one transport device is set up to transport at least one of the workpieces and at least one of the tools to the at least one processing machine. The at least one processing machine is preferably set up to process the at least one workpiece with at least one of the tools in at least one processing step, wherein a transport device has all tools required for the at least one processing step of a processing machine.

In particular, the processing machines can be machines for machining purposes. If the at least one workpiece is to be processed on several processing machines, the transport device can transport the at least one workpiece from one processing machine to the next. In this case, the transport device preferably has all tools required for completely processing the at least one workpiece on the processing machines. For example, a processing step can involve drilling a hole.

It is further advantageous for the at least one transport device to be set up to be transported by a transport trolley, in particular by an autonomously driving transport trolley, to the at least one processing machine of the system for processing workpieces. It is preferred that the at least one transport device can be detachably connected with the transport trolley. In addition, it can also be preferred that the transport device be capable of being transported not by a transport trolley, but instead by a robot, for example a cartesian robot, or other conveying systems known from prior art. In a case where the transport device is transported by a transport trolley, it is preferred that the lowermost floor surface of the transport device or the floor wall of the lowermost transport system be arranged spaced apart from the floor (on which the transport trolley travels), so that a transport trolley, for example a lifting trolley, can travel under the transport device and lift and transport the latter. For example, the spacing from the floor can be achieved by a frame, wherein the frame is either directly connected with the transport device, for example the lowermost transport system, or the transport device is placed on such a frame before it is transported by the transport trolley.

The invention will be described in more detail below based on exemplary embodiments and the drawing. All described and/or graphically depicted features here comprise the subject matter of the invention, whether separately or in any combination, regardless of how they are summarized in the claims or back referenced.

DETAILED DESCRIPTION

Figure 1:
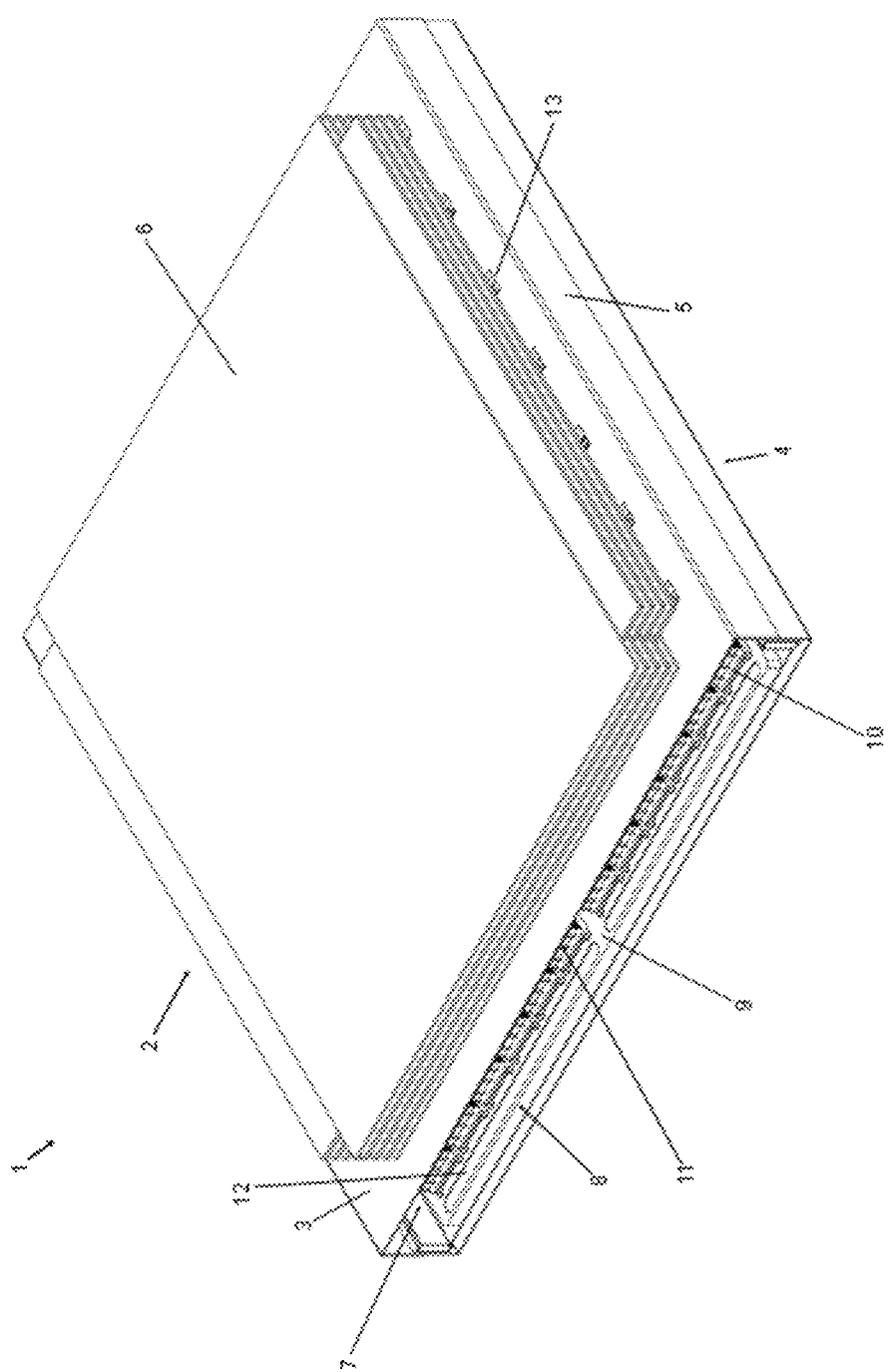
FIG. 1 is a perspective view of a first embodiment of a transport device according to the invention with a transport system.

FIGS. 1 to 7 show a first embodiment according to the invention of a transport device 1, wherein a workpiece 6 is arranged directly on a ceiling wall 3 of the transport system 2. A second inventive embodiment of a transport device 1, and hence the combination of at least one transport system 2 and a cover plate 18, are shown on FIGS. 8 to 10.

FIG. 1 shows a transport device 1 with a transport system 2. The transport system 2 has a ceiling wall 3, a floor wall 4 and two opposing side walls 5. The side walls 5 of the transport system 2 are shown in two parts on FIG. 1. One part of one side wall 5 is here connected with the ceiling wall 3, and another part of the side all 5 is connected with the floor wall 4.

In addition, the ceiling wall 3 of the transport system 2 has a workpiece 6, here a printed circuit board. Furthermore, the ceiling wall 3 and the floor wall 4 are arranged spaced apart, so that the transport system 2 has an intermediate space 7 between the ceiling wall 3 and the floor wall 4 with an opening 8. A transport box 9 is arranged in the intermediate space 7. The transport box 9 has several cassettes 10 with tools 11. In addition, the transport box 9 has two markings 12.

Figure 2:
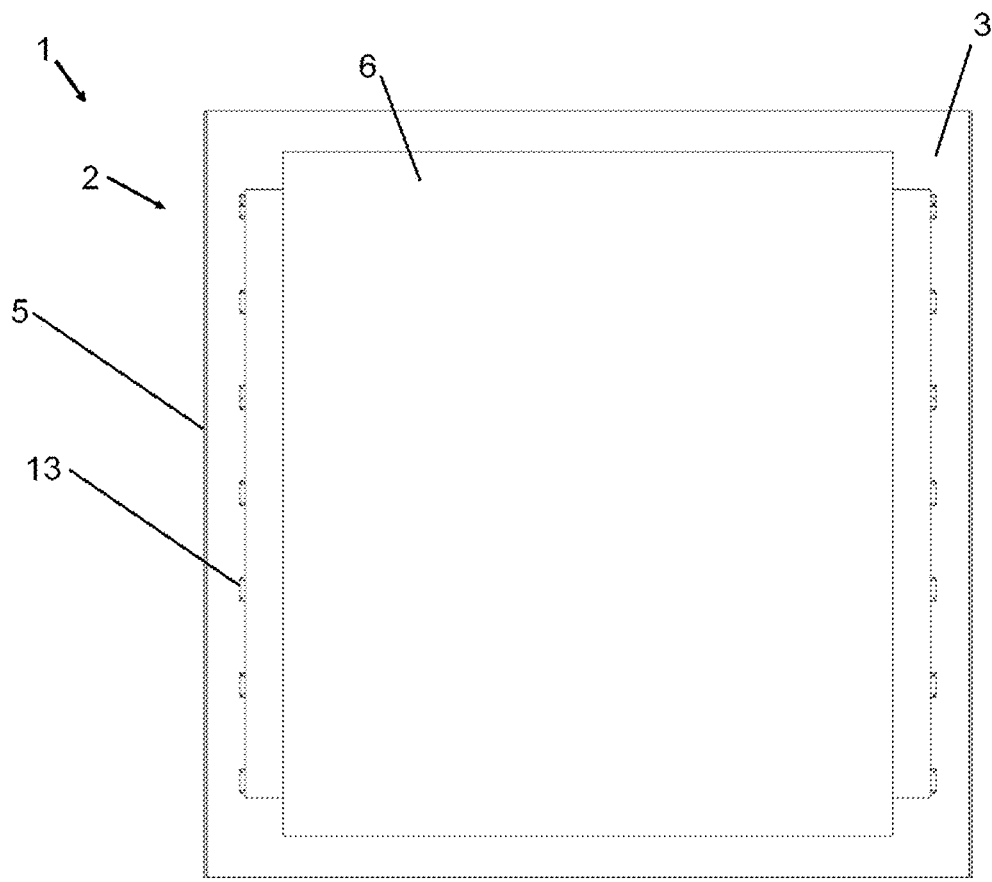
FIG. 2 is a top view of the transport device according to FIG. 1.

The top view of the transport device 1 shown on FIG. 2 also shows that the workpiece 6 is centrally arranged on the ceiling wall 3. The transport device 1 can here also have fastening means (not shown). As described before, the fastening means can be configured in the form of rubber lips. Moreover, the transport device 1, and more precisely the ceiling wall 3, has a perforation 13 in the form of slits or inlets.

Figure 3:
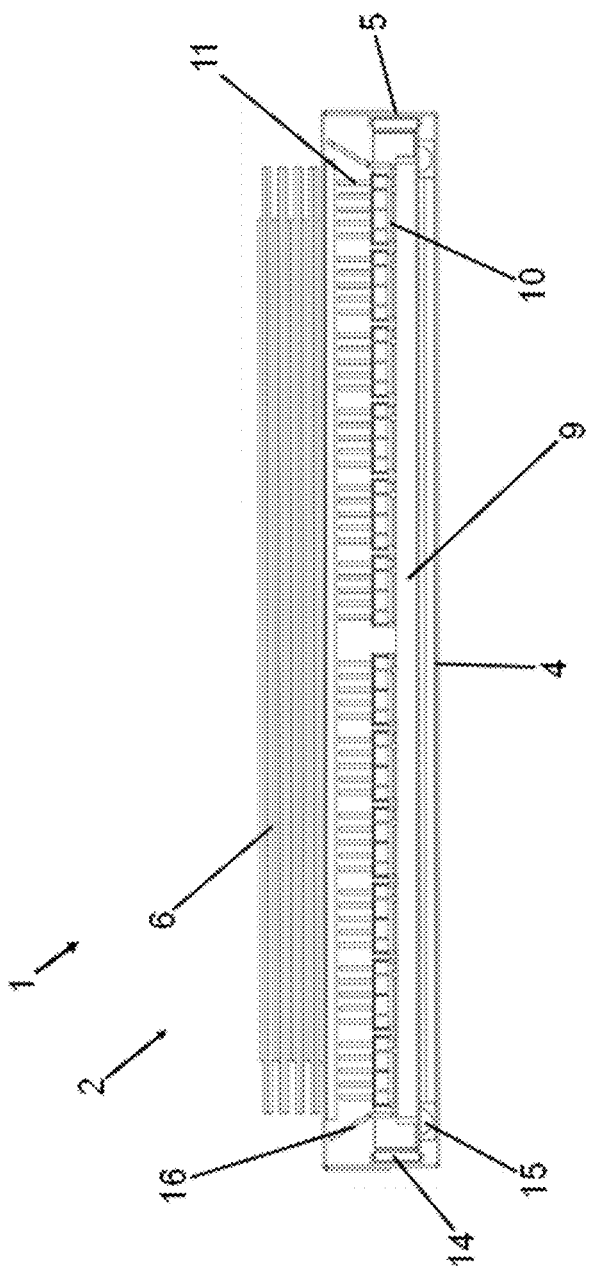
FIG. 3 is a front view of the transport device according to FIG. 1.

FIG. 3 shows the front view of the transport device 1 according to the invention. In the illustration on FIG. 3, a stack with several workpieces, here several printed circuit boards, rest on the transport device 1. As opposed to the illustration on FIG. 3, it is basically also possible to position one or several workpieces in a depression, so as to secure them against slippage. However, the perforation 13 in the ceiling wall 3 of a transport system 2 of a transport device 1 preferably serves to receive a cover plate 18, wherein the cover plate 18 in turn preferably receives the workpieces 6, or to receive another transport system 2. For example, slanted cassettes can be arranged on the cover plate 18 (not shown here) in order to receive the workpieces 6 or the tools 11.

The transport box 9 on FIG. 3 is additionally connected with the side walls 5 via guiderails 14. Moreover, the transport box 9 can be supported on rollers 15. Furthermore, the transport box 9 has a respective handle 16.

Figure 4:
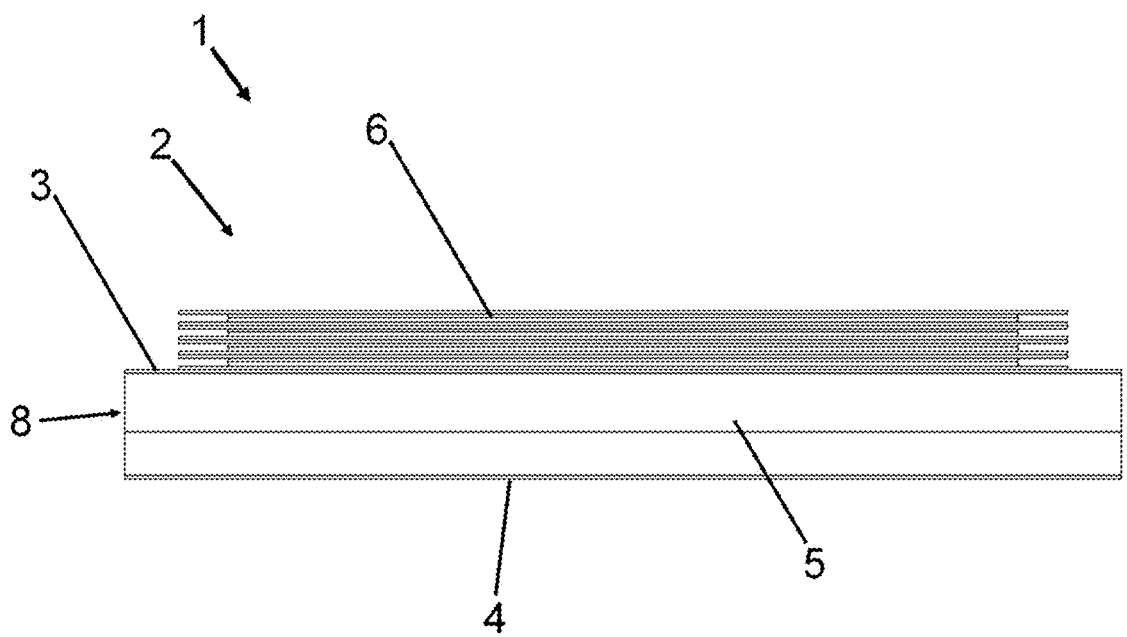
FIG. 4 is a side view of the transport device according to FIG. 1.

The side view on FIG. 4 shows the two-part side wall 5, as well as the workpiece 6 partially recessed into the depression (not shown). Moreover, the transport device 1 has the opening 8 on the front side.

Figure 5:
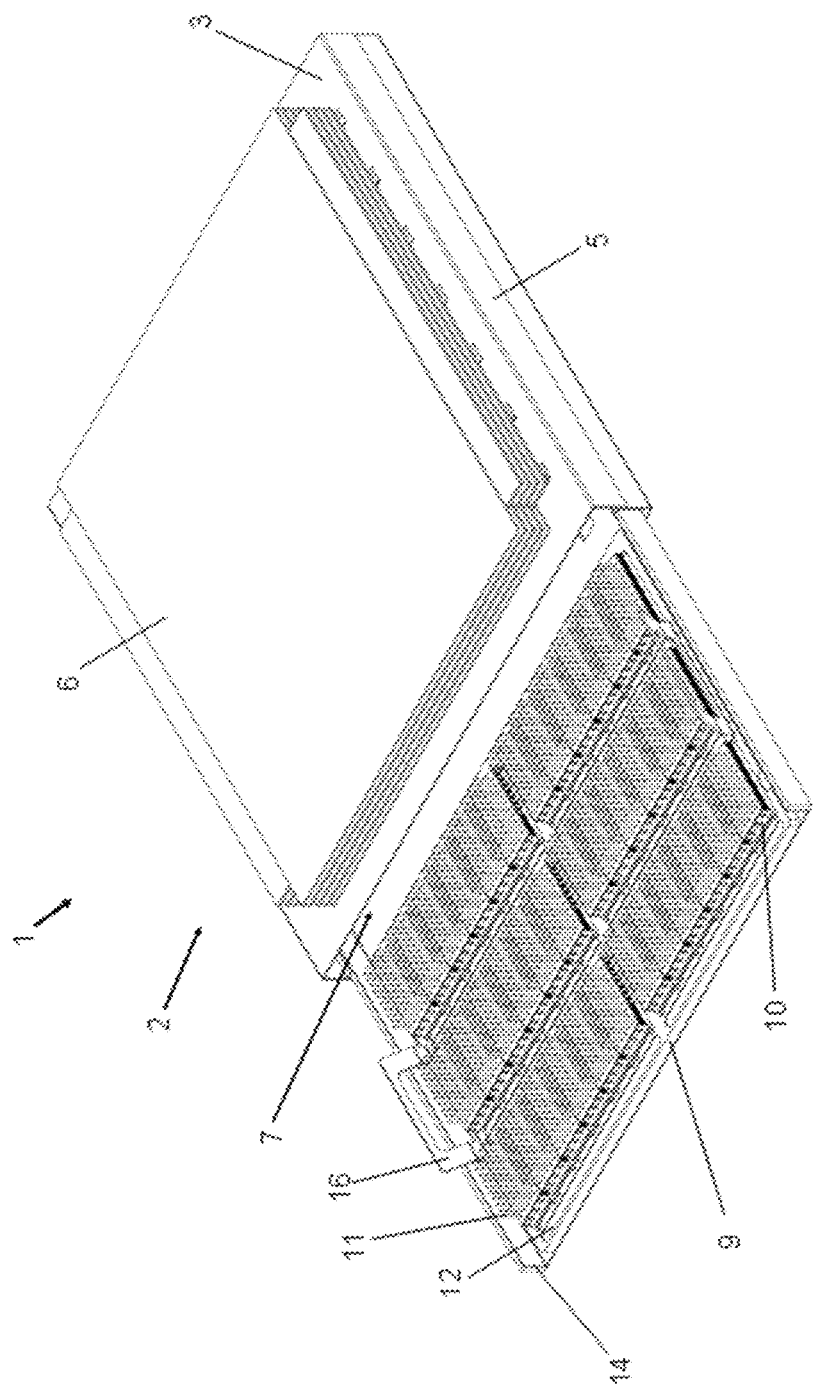
FIG. 5 is a perspective view of the transport device according to the first embodiment with extended transport box.
Figure 8:
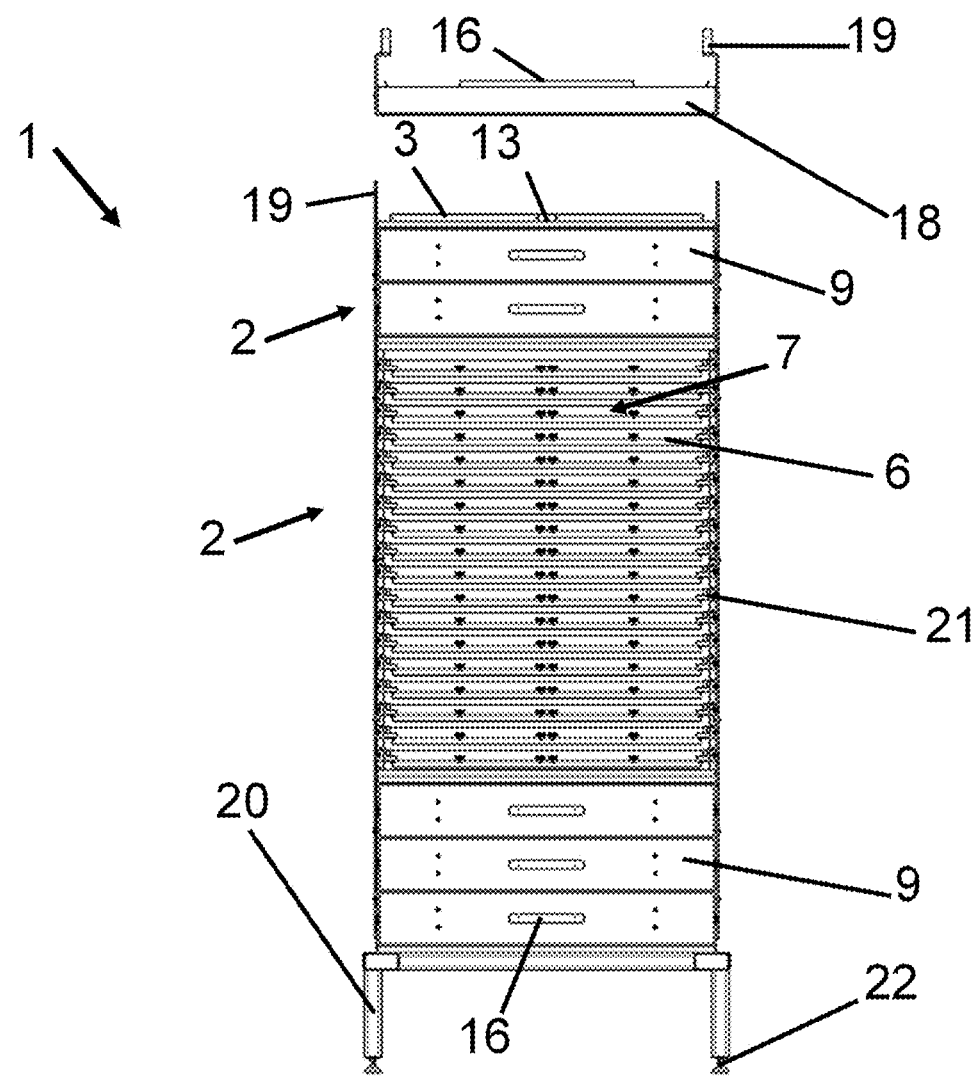
FIG. 8 is a front view of a second embodiment of a transport device according to the invention.
Figure 9:
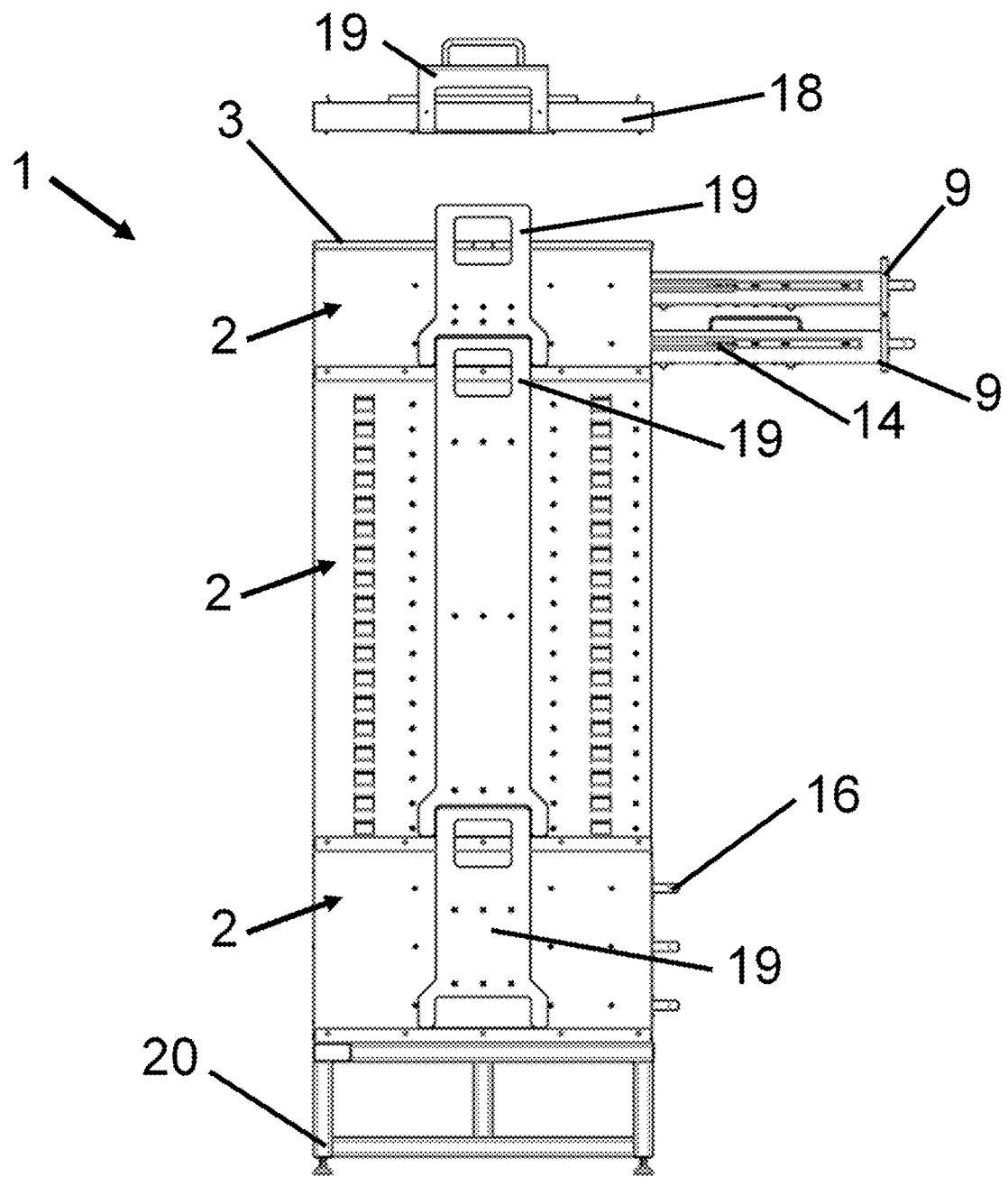
FIG. 9 is a side view of the transport device according to FIG. 8.
Figure 10:
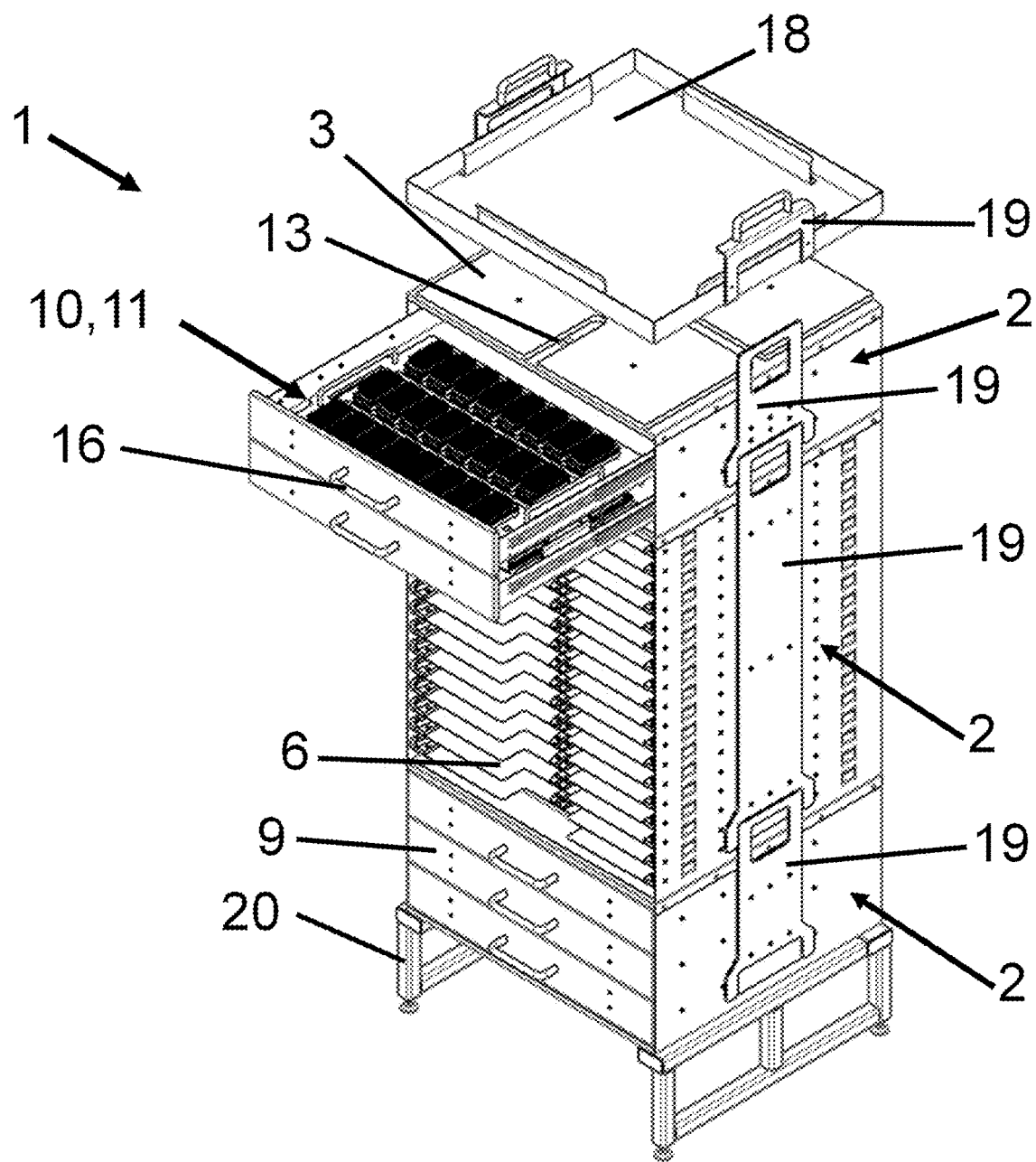
FIG. 10 is a perspective view of the transport device according to FIGS. 8 and 9.

FIG. 5 shows a transport device 1 with a transport system and with extended transport box 9. The transport box 9 here has two handles 16, which are arranged on the side in the area of the guiderails 14. Depending on the embodiment, at least one handle 16 can also be arranged on an undepicted side wall, which is situated transverse to the guiderails 14, and be set up to pull the transport box 9 out of the intermediate space 7. The second embodiment according to FIGS. 8 to 10 shows such an arrangement of a handle. Moreover, the transport box 9 reveals a total of 36 cassettes 10. Each cassette 10 here has several tools 11. The cassettes 10 are arranged in 6 groups of 6 cassettes 10 each, wherein each group has a respective marking 12. In addition, a sensor device (not shown here) is arranged on the floor wall 4.

Figure 6:
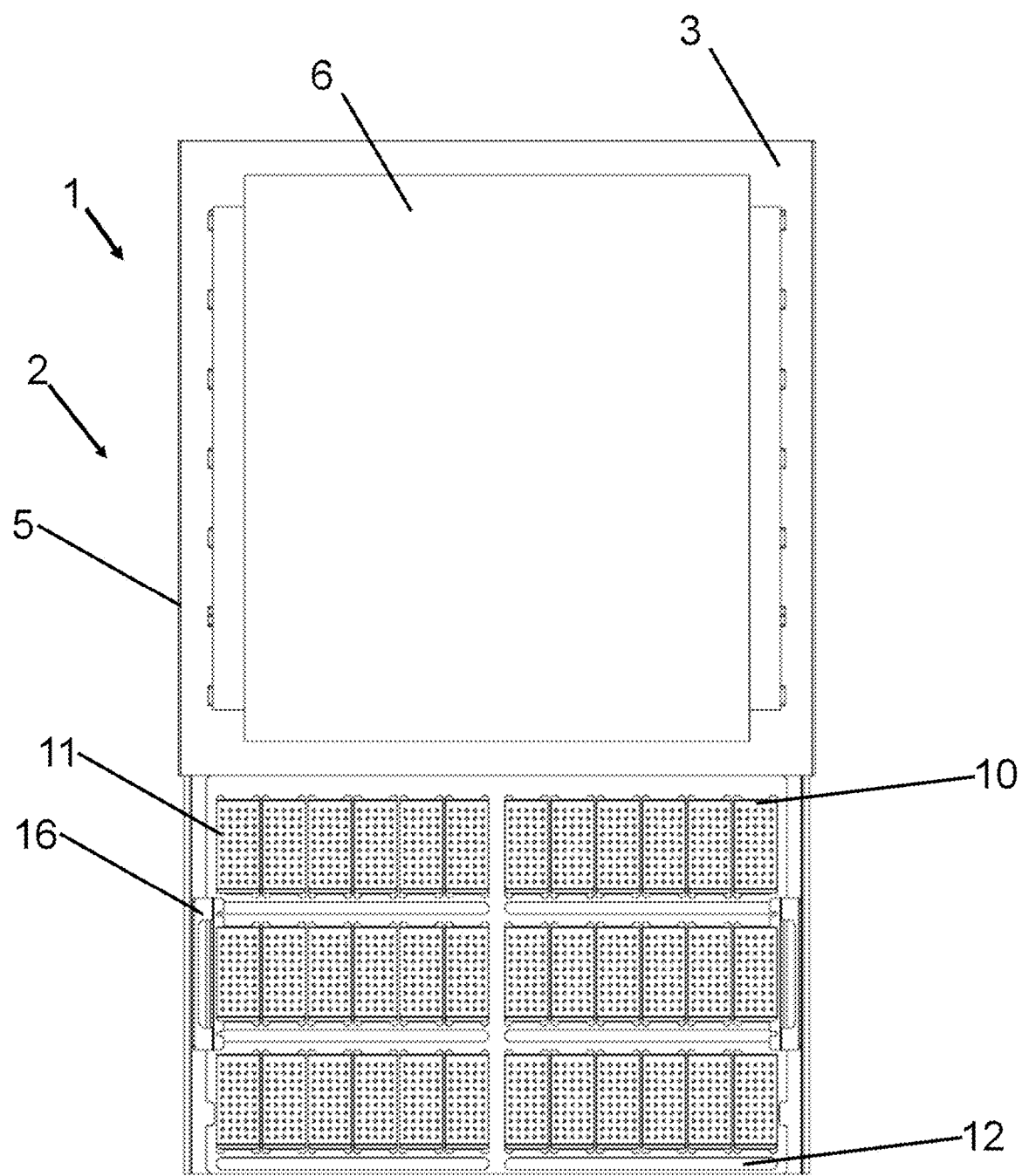
FIG. 6 is a top view of the transport device according to FIG. 5.

FIG. 6 shows a top view of the transport device 1 shown in perspective on FIG. 5. In addition to the features already depicted on the remaining figures, it can be derived from FIG. 6 that each cassette 10 has a respective 50 tools 11. Of course, the cassettes 10 are not necessarily to be completely equipped, and can vary in terms of their geometry and/or receiving capacity. In particular the use of cassettes with higher receiving capacities, for example a receiving capacity of up to 200 tools, can be preferred.

Figure 7:
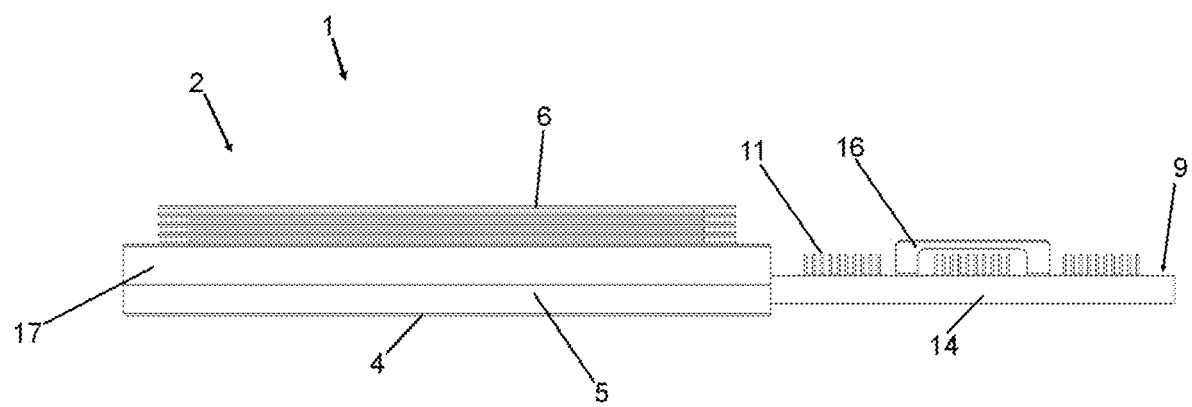
FIG. 7 is a side view of the transport device according to FIG. 5.

As further evident from the side view on FIG. 7, the tools 11 protrude over the edge of the transport box 9 or the edge of the guiderails 14. In addition, the side of the transport device 1 has a label 17.

A second embodiment of a transport device 1 according to the invention is shown on FIGS. 8, 9 and 10 from the side, the front, and in perspective. The transport device 1 here has three transport systems 2 and a cover plate 18. The transport device 1 is arranged on a frame 20 with screw-in feet 22. The screw-in feet 22 can serve to offset uneven floors. The number of transport systems 2 that are connected with each other to form the transport device 1 can be varied as desired.

The uppermost transport system 2 has a ceiling wall 3 that is set up to be connected with the cover plate 18, and comprises an intermediate space 7 with two transport boxes 9. The ceiling wall 3 here has a perforation 13 in the form of inlets or slits, which can interact with corresponding counter-pieces arranged on the floor of the cover plate 18.

The central transport system 2 lying thereunder likewise comprises an intermediate space 7 with several receptacles (holders) in the form of support elements 21 arranged opposite each other. Two support elements 21 arranged opposite each other here each receive a workpiece 6, for example a printed conductor board blank. A total of 18 workpieces 6 are here received on FIG. 8.

The lowermost transport system 2 comprises three transport boxes 9, wherein the lowermost transport system 2, and hence the transport device 1, is arranged on a frame 20. Each of the transport boxes 9 shown on FIG. 8 has a handle 16. In addition, each transport system 2 as well as the cover plate 18 have intermeshing handle tabs 19. FIG. 9 provides a better view of the handle tabs 19.

The handle tabs 19 of a lower transport system 2 here each engage into the handle tabs 19 of a transport system 2 arranged thereover. When the cover plate 18 on FIG. 9 is placed on the uppermost transport system 2, the handle tabs 19 of the transport system 2 lying thereunder also engage into the handle tabs 19 of the cover plate 18. The two transport boxes 9 of the uppermost transport system 2 are additionally shown in an extended position in FIG. 9. The guiderails 14 become visible in this position, and can be used to move the transport box 9 within the intermediate space 7 of the transport system 2.

FIG. 10 shows a perspective view of the transport device 1 on FIGS. 8 and 9. In particular the workpieces 6 arranged in the intermediate space 7 of the central transport system 2 here become clearly visible. Additionally shown are the cassettes 10 depicted among other things on FIG. 6 for receiving tools 11 in the uppermost transport box 9 of the uppermost transport system 2. Also shown are perforations 13 of the ceiling wall 3 of the uppermost transport system 2 in the form of inlets or slits. In the depicted embodiment, each perforation 13 blocks a movement in at least three directions of movement, for example when the perforation 13 interacts with a corresponding counter-piece of a cover plate 18. The transport systems 2 and the cover plate 18 can be secured among each other against lateral slippage in particular by the perforations 13.

In a manufacturing and production process, a transport device 1 with at least one transport system 2 as depicted on FIGS. 1 to 7, or a transport device 1 with several transport systems 2 as depicted on FIGS. 8 to 10, can transport a workpiece 6 together with the tools 11 required for at least one processing step of an undepicted processing machine. The transport device 1 can be transported by an undepicted transport trolley. The tools 11 are arranged in 36 cassettes 10. Each of the depicted cassettes 10 (see in particular FIG. 6) can receive up to 50 tools 11. Furthermore, cassettes not depicted here can be used to receive up to 200 tools. The cassettes 10 are fixed on a transport box 9 that can be extracted from an intermediate space 7. In particular, the transport box 9 can be removed from the intermediate space 7 by applying a force. If the transport box 9 is retracted, it can be fixed in place via undepicted magnets. A sensor device acquires the position of the transport box 9. The handles 16 allow the transport box 9 to be removed from the transport system 2. In particular, the removal makes it possible to more easily clean or reequip the transport box 9.

Due to the easy dismantlability into the individual transport systems 2 and the cover plate 18, the modular transport device 1 can be quickly and easily remodulated, so that the number and/or type of transport systems 2 and the cover plate 18 can be adjusted based on the required conditions, for example to the workpiece 6 to be processed.

In an at least partially mechanized production and manufacturing process, the transport device 1 can be transported to a workplace with a processing machine. A worker can remove the workpiece 6 from the transport system 2 and feed it to the processing machine. The worker can glean the model type of the workpiece 6 from the label 17. The worker can subsequently pull the transport box 9 with the cassettes 10 out of the intermediate space 7. The worker then feeds the cassette 10 having the up to 200 tools to the processing machine. For example, a worker can determine the cassettes 10 for the corresponding processing machine based on the label 17. The cassettes 10 can symbolize the processing steps from left to right, wherein the cassette 10 on the left side symbolizes the first processing step, and the cassette 10 on the right side symbolizes the sixth processing step. As a consequence, if the worker wants to perform the third processing step, the worker removes a tool 11 from the third cassette 10 from the left out of the cassette group provided for the processing machine. After running through all processing steps on the processing machine, the worker closes the transport system 2 or the transport device 1 by pushing the transport box 9 back into the intermediate space 7. The transport box 9 can be fixed in the intermediate space 7 via magnets, so that the transport box 9 does not inadvertently extend. Furthermore, the sensor device acquires the position of the transport box 9. In a case where the transport device 1 is transported by a transport trolley, the transport trolley can detect from a corresponding signal of the sensor device that the worker has concluded processing the workpiece on the processing machine. The transport trolley then transports the workpiece 6 together with the tools 11 to the next processing machine.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A transport device comprising:
a cover plate; and
at least one transport system for jointly transporting at least one tool and at least one workpiece, wherein the at least one transport system includes:
a ceiling wall;
a floor wall spaced apart from the ceiling wall;
at least one side wall; and
at least one intermediate space between the ceiling wall and the floor wall,
wherein the at least one intermediate space has at least one opening,
wherein the ceiling wall as well as the at least one intermediate space each have at least one holder or the cover plate connected with the ceiling wall as well as the at least one intermediate space each have at least one holder,
wherein a first holder of the at least one holder is configured to receive the at least one workpiece,
wherein a second holder of the at least one holder is configured to receive the at least one tool,
wherein the cover plate is connected with the ceiling wall of one of the transport systems of the transport device by a form-fit,
wherein the at least one transport system includes at least two handle tabs extending vertically above a top surface of the at least one transport system,
wherein the cover plate includes at least two handle tabs extending vertically above a top surface of the cover plate,
wherein each of the at least two handle tabs of the at least one transport system and the at least two handle tabs of the cover plate are configured to be gripped by a worker,
wherein the at least two handle tabs of the at least one transport system engage into the at least two handle tabs of the cover plate,
wherein relative lateral movement between the at least one transport system and the cover plate is restricted when the at least two handle tabs of the at least one transport system are engaged into the at least two handle tabs of the cover plate, and
wherein relative vertical movement between the at least one transport system and the cover plate is not restricted when the at least two handle tabs of the at least one transport system are engaged into the at least two handle tabs of the cover plate.

2. The transport device according to claim 1, wherein the at least one holder of the ceiling wall is set up to receive the at least one workpiece.

3. The transport device according to claim 1, wherein the at least one opening is arranged on a side wall of the transport system, and wherein the opening is at least identical to a cross sectional surface of the at least one intermediate space.

4. The transport device according to claim 1, wherein the at least one holder of the at least one intermediate space has at least one transport box.

5. The transport device according to claim 4, wherein the at least one transport box can be moved from a retracted position into an extended position.

6. The transport device according to claim 5, wherein the at least one transport box is guided over at least one guiderail, and wherein the transport box is secured in at least one of the retracted or extended positions by latching means.

7. The transport device according to claim 4, wherein the transport box has at least one cassette for receiving the at least one tool.

8. The transport device of claim 7, wherein the tool and/or the holder of the at least one workpiece and/or the holder of the at least one tool and/or the transport box and/or the cassette and/or the cover plate have at least one marking, in particular a color marking.

9. The transport device according to claim 5, wherein the at least one transport box is secured in the retracted position by at least one magnet.

10. The transport device according to claim 5, wherein the transport device has a sensor device that determines whether the transport box is in the retracted position or the extended position.

11. The transport device according to claim 1, wherein the transport device has at least two transport systems connected with each other, wherein the floor wall of a first transport system is connected with the ceiling wall of a second transport system and/or handle tabs of the first transport system are connected with handle tabs of the second transport system, and wherein the at least two transport systems have a positive connection.

12. The transport device of claim 1, wherein the transport device has an individual label.

13. The transport device of claim 1, characterized in that the at least one holder of the ceiling wall or the cover plate has a depression.

14. The transport device of claim 1, wherein each of the at least two handle tabs of the at least one transport system and the at least two handle tabs of the cover plate include a through-hole configured to receive one or more fingers of the worker.

15. A system for processing workpieces, comprising:
at least one transport device according to claim 1; and
at least one processing machine, wherein the at least one transport device is set up to transport at least one of the workpieces and at least one of the tools to the at least one processing machine, wherein the at least one processing machine is set up to process the at least one workpiece with at least one of the tools in at least one processing step, wherein the transport device includes all of the tools required for the at least one processing step of the at least one processing machine.

16. The system for processing workpieces according to claim 15, wherein the at least one transport device is set up to be transported by a transport trolley to the at least one processing machine.

* * * * *